US008147392B2

(12) United States Patent  
Piramoon et al.

(10) Patent No.: US 8,147,392 B2  
(45) Date of Patent: Apr. 3, 2012

(54) FIXED ANGLE CENTRIFUGE ROTOR WITH HELICALLY WOUND REINFORCEMENT

(75) Inventors: Sina Piramoon, San Jose, CA (US); Alireza Piramoon, Santa Clara, CA (US)

(73) Assignee: Fiberlite Centrifuge, LLC, Santa Clara, CA (US)

( * ) Notice: Subject to any disclaimer, the term of this patent is extended or adjusted under 35 U.S.C. 154(b) by 517 days.

(21) Appl. No.: 12/391,838

(22) Filed: Feb. 24, 2009

(65) Prior Publication Data

US 2010/0216622 A1    Aug. 26, 2010

(51) Int. Cl.  
    *B04B 5/02*      (2006.01)

(52) U.S. Cl. ............................... 494/16; 494/81

(58) Field of Classification Search .................. 494/12, 494/16–21, 31, 33, 43, 81; 74/572.11, 572.12, 74/572.21  
See application file for complete search history.

(56) References Cited

U.S. PATENT DOCUMENTS

| | | | | |
|---|---|---|---|---|
| 3,248,046 A | * | 4/1966 | Feltman, Jr. et al. ........... | 494/16 |
| 4,123,949 A | * | 11/1978 | Knight et al. .................. | 74/572.21 |
| 4,176,563 A | * | 12/1979 | Younger ........................ | 74/572.2 |
| 4,183,259 A | * | 1/1980 | Giovachini et al. ............. | 74/572.1 |
| 4,359,912 A | * | 11/1982 | Small ............................ | 74/572.12 |
| 4,468,269 A | * | 8/1984 | Carey ............................ | 156/175 |
| 4,624,655 A | * | 11/1986 | Cole .............................. | 494/20 |
| 4,659,325 A | * | 4/1987 | Cole et al. ..................... | 494/20 |
| 4,701,157 A | * | 10/1987 | Potter ............................ | 494/16 |
| 4,738,656 A | | 4/1988 | Piramoon et al. | |
| 4,781,669 A | * | 11/1988 | Piramoon ....................... | 494/16 |
| 4,790,808 A | * | 12/1988 | Piramoon ....................... | 494/81 |
| 4,817,453 A | * | 4/1989 | Breslich et al. ................ | 74/572.4 |
| 4,824,429 A | * | 4/1989 | Keunen et al. ................. | 494/16 |
| 4,860,610 A | * | 8/1989 | Popper et al. .................. | 74/572.4 |
| 4,944,721 A | * | 7/1990 | Carson ........................... | 494/16 |
| 4,991,462 A | * | 2/1991 | Breslich et al. ................ | 74/572.4 |
| 5,057,071 A | * | 10/1991 | Piramoon ....................... | 494/16 |
| 5,206,988 A | | 5/1993 | Piramoon | |
| 5,362,301 A | * | 11/1994 | Malekmadani et al. ........ | 494/16 |
| 5,382,219 A | * | 1/1995 | Malekmadani ................ | 494/16 |
| 5,411,465 A | | 5/1995 | Glen et al. | |
| 5,505,684 A | * | 4/1996 | Piramoon ....................... | 494/16 |
| 5,527,257 A | * | 6/1996 | Piramoon ....................... | 494/20 |
| 5,533,644 A | * | 7/1996 | Glen et al. ..................... | 494/16 |
| 5,540,126 A | | 7/1996 | Piramoon | |
| 5,558,616 A | * | 9/1996 | Barkus et al. .................. | 494/12 |
| 5,562,582 A | * | 10/1996 | Malekmadani ................ | 494/16 |
| 5,562,584 A | * | 10/1996 | Romanauskas ................ | 494/20 |
| 5,601,522 A | * | 2/1997 | Piramoon ....................... | 494/16 |
| 5,643,168 A | * | 7/1997 | Piramoon et al. .............. | 494/16 |
| 5,683,341 A | | 11/1997 | Giebeler | |

(Continued)

FOREIGN PATENT DOCUMENTS

WO     WO 9855237 A1 * 12/1998

*Primary Examiner* — Charles E Cooley  
(74) *Attorney, Agent, or Firm* — Wood, Herron & Evans, LLP

(57) ABSTRACT

A centrifuge rotor includes a rotor body having first and second axial ends and a circumferential sidewall extending therebetween. The rotor body has a plurality of wells for receiving sample containers to be processed in the rotor. The rotor further includes an elongate reinforcement extending around the circumferential sidewall of the rotor body along a helical path. At least two portions of the elongate reinforcement interlock at one or more specific points on the surface of the rotor.

17 Claims, 17 Drawing Sheets

U.S. PATENT DOCUMENTS

| | | | |
|---|---|---|---|
| 5,759,592 A * | 6/1998 | Piramoon et al. | 425/414 |
| 5,776,400 A * | 7/1998 | Piramoon et al. | 264/219 |
| 5,833,908 A * | 11/1998 | Piramoon et al. | 264/250 |
| 5,876,322 A * | 3/1999 | Piramoon | 494/16 |
| 5,972,264 A | 10/1999 | Malekmadani et al. | |
| 6,056,910 A | 5/2000 | Fritsch et al. | |
| 6,296,798 B1 * | 10/2001 | Piramoon | 264/257 |
| 6,482,342 B1 * | 11/2002 | Malekmadani et al. | 264/102 |
| 6,916,282 B2 * | 7/2005 | Aizawa | 494/20 |
| 2010/0184578 A1 * | 7/2010 | Piramoon et al. | 494/20 |
| 2010/0216622 A1 * | 8/2010 | Piramoon et al. | 494/21 |
| 2010/0273626 A1 * | 10/2010 | Piramoon | 494/20 |
| 2010/0273629 A1 * | 10/2010 | Piramoon et al. | 494/80 |
| 2011/0111942 A1 * | 5/2011 | Piramoon | 494/16 |
| 2011/0136647 A1 * | 6/2011 | Piramoon et al. | 494/20 |

* cited by examiner

FIXED ANGLE CENTRIFUGE ROTOR WITH HELICALLY WOUND REINFORCEMENT

TECHNICAL FIELD

This invention relates generally to centrifuge rotors and, more particularly, to a reinforcement structure and methods for making fixed-angle centrifuge rotors.

BACKGROUND

Centrifuge rotors are typically used in laboratory centrifuges to hold samples during centrifugation. While centrifuge rotors may vary significantly in construction and in size, one common rotor structure is the fixed angle rotor having a solid rotor body with a plurality of wells or cavities distributed radially within the rotor body and arranged symmetrically about an axis of rotation. Samples are placed in the wells, allowing a plurality of samples to be subjected to centrifugation.

Conventional fixed angle centrifuge rotors may be made from metal or various other materials. However, a known improvement is to construct a centrifuge rotor by a compression molding process wherein the rotor is fabricated from a suitable material such as composite carbon fiber. For example, a fixed angle centrifuge rotor may be compression molded from layers of resin-coated carbon fiber laminate material. Examples of composite centrifuge rotors are described in U.S. Pat. Nos. 4,738,656, 4,781,669, 4,790,808, 5,505,684, 5,601,522, 5,643,168, 5,759,592, 5,776,400, 5,833,908, 5,876,322, 6,056,910, and 6,296,798, each owned by the common assignee and incorporated herein by reference in its entirety.

Because centrifuge rotors are commonly used in high rotation applications where the speed of the centrifuges may exceed hundreds or even thousands of rotations per minute, the centrifuge rotors must be able to withstand the stresses and strains experienced during the high speed rotation of the loaded rotor. During centrifugation, a rotor with samples loaded into the wells experiences high forces along directions radially outwardly from the wells and in directions along the longitudinal axes of the wells, consistent with the centrifugal forces exerted on the sample containers. These forces cause significant stress and strain on the rotor body.

A centrifuge rotor should be able to withstand the forces associated with rapid centrifugation over the life of the rotor. A need therefore exists for centrifuge rotors that provide improved performance in consideration of the dynamic loads experienced during centrifugation.

SUMMARY

The present invention overcomes the foregoing and other shortcomings and drawbacks of centrifuge rotors heretofore known for use for centrifugation. While the invention will be discussed in connection with certain embodiments, it will be understood that the invention is not limited to these embodiments. On the contrary, the invention includes all alternatives, modifications, and equivalents as may be included within the spirit and scope of the invention.

In one aspect, a centrifuge rotor includes a rotor body having a circumferential sidewall and multiple sample wells. An elongate reinforcement extends around the circumferential sidewall along a helical path. In one embodiment, the elongate reinforcement extends around the circumferential sidewall such that two or more portions of reinforcement interlock at locations on the circumferential sidewall corresponding to the axial position of a center of gravity of one or more loaded wells. In another embodiment, the elongate reinforcement extends around the circumferential sidewall such that two or more portions of reinforcement interlock at a location corresponding to the intersection of a longitudinal axis of a well with a bottom surface of the rotor body.

In another embodiment, the elongate reinforcement is a single carbon fiber tow. In another embodiment, two carbon fiber tows are used to reinforce the rotor body. In another embodiment, the helical path of the reinforcement extends along both the sidewall and the bottom surface of the rotor body. In another embodiment, the elongate reinforcement is wound further along the top of the rotor body.

In another embodiment, the rotor may also include a lip on the rotor body with a larger and smaller inner diameter forming a stepped profile, and a lid that is supported by the stepped profile of the lip. The lid is coupled to an annular sealing member that is received on and removed from the lip without interference between the outer diameter of the sealing member and the larger inner diameter, but the outer diameter of the sealing member expands to sealingly receive the first inner diameter when the lid is fully seated on the lip.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
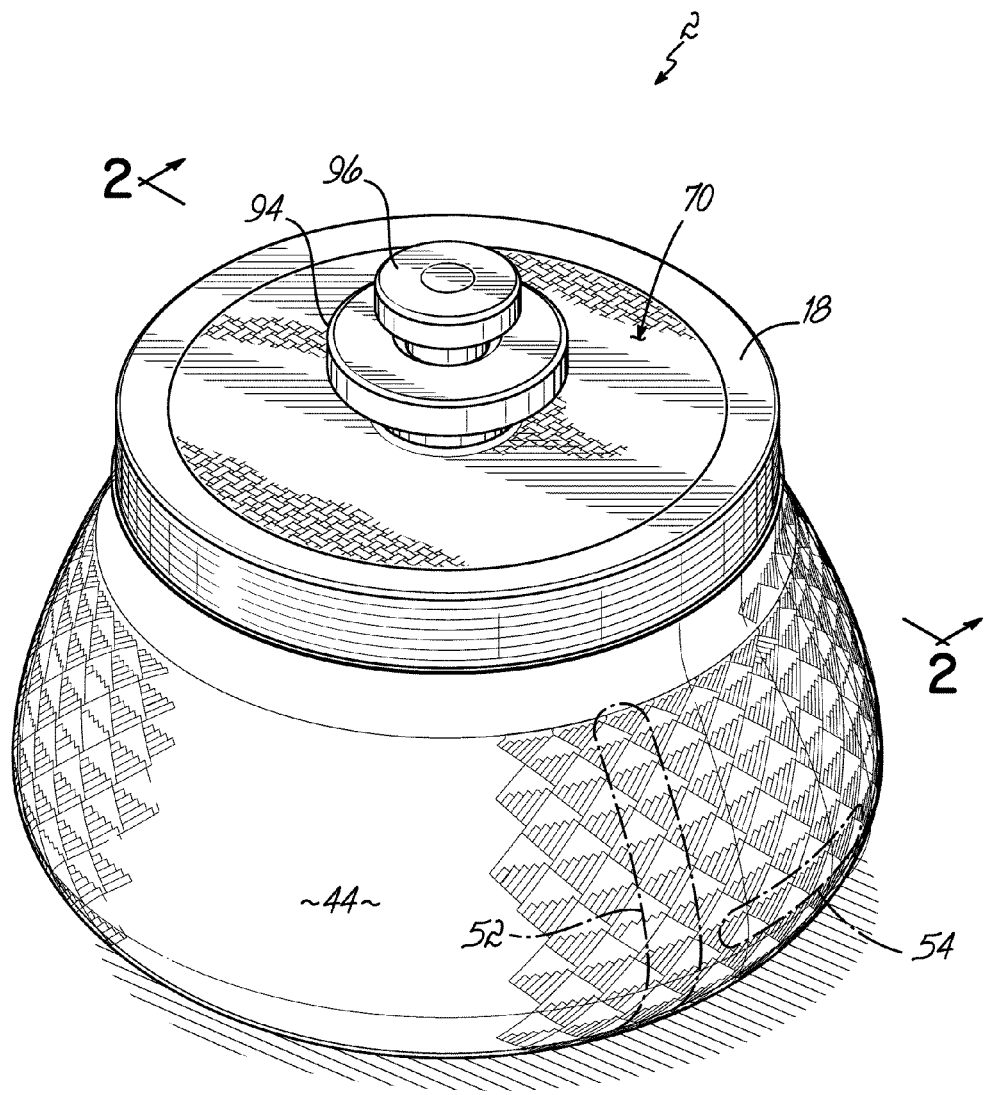
FIG. 1 is a perspective view of a centrifuge rotor assembly in accordance with one embodiment of the present invention.
Figure 2:
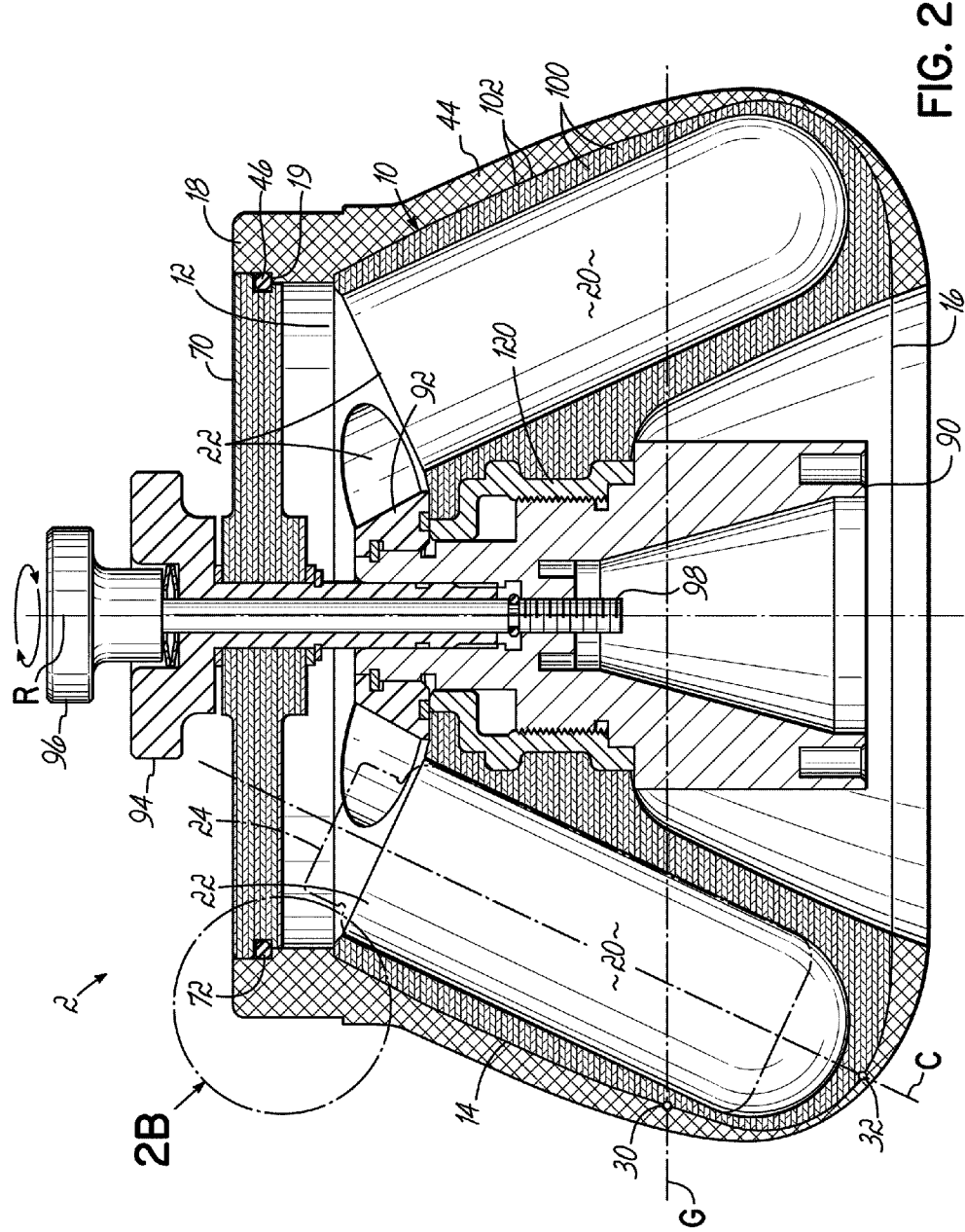
FIG. 2 is a cross-sectional elevation view of the assembly of FIG. 1, taken along line 2-2.

FIGS. 1 and 2 depict an exemplary centrifuge rotor assembly 2 comprising a rotor body 10 and multiple layers of reinforcement material 44 disposed on an outer surface thereof. The layers are formed from a reinforcement material 44 that extends in a helical path 50 around the outer surface of the rotor body 10, as further described below. The layers 44 cover the rotor body 10 having a circumferential sidewall 14 with a smooth surface and defining a generally rounded conical shape of the rotor body 10. The rotor body 10 is rotationally symmetrical about a central rotational axis R. The rotor has an upper end 12 and a lower end 16. The rotor body may be formed such that the substantially smooth outer surface of the circumferential sidewall 14 requires no additional machining or finishing prior to the application of the layers 44, as disclosed below.

As used herein, a "smooth circumferential sidewall" means that the circumferential sidewall does not comprise a stepped configuration, and is generally free of corners or sharp edges. This term is not intended to define the surface roughness of the circumferential sidewall.

In the embodiment shown, the lower end 16 has a rounded external surface that smoothly blends with the sidewall 14 to form a continuous curve. It will be appreciated that the lower end 16 may alternatively comprise various other shapes.

As shown in FIG. 2, the rotor body 10 includes a plurality of wells 20, each having an open end 22 proximate the upper end 12 of the rotor body 10. Each well 20 has a central longitudinal axis C. FIG. 2 also illustrates the approximate location of the center of gravity of a sample container filled with material to be processed in the centrifuge rotor assembly and seated in a well 20. Collectively, the centers of gravity of the loaded wells define a plane G extending through the rotor assembly 2 as shown.

As used herein, the term "loaded well" refers to a well within a centrifuge rotor that includes a sample container properly positioned within the well and substantially filled with material to be processed. During rapid centrifugation, a loaded well may experience stresses associated with the filled sample container. The location of the loaded well center of gravity corresponds to a location of strain or stress where forces act when the centrifuge rotor undergoes rapid centrifugation of filled sample containers positioned within the well.

The rotor assembly 2 is shown mounted to a rotor hub 90, which is attached to the centrifuge. To mount the rotor assembly 2 to the rotor hub 90, the rotor assembly 2 includes a rotor insert 120 that fits securely around the rotor hub 90. The rotor insert 120 is coupled to the rotor body 10 as described below. Once the rotor assembly 2 is seated on the rotor hub 90, a hub retainer 92 is fastened to the top of the hub 90 to facilitate holding the rotor assembly 2 into place. The rotor assembly 2 also includes a lid 70, which is coupled to a lid screw 94. The lid screw 94 screws into the central region of the rotor hub 90. Once the lid 70 is in place, turning a tie down knob 96 coupled to a tie down screw 98 within the lid screw 94 presses down on the lid screw 94, which in turn presses down on the lid 70, securing the lid 70 into place as described below.

Figure 3A:
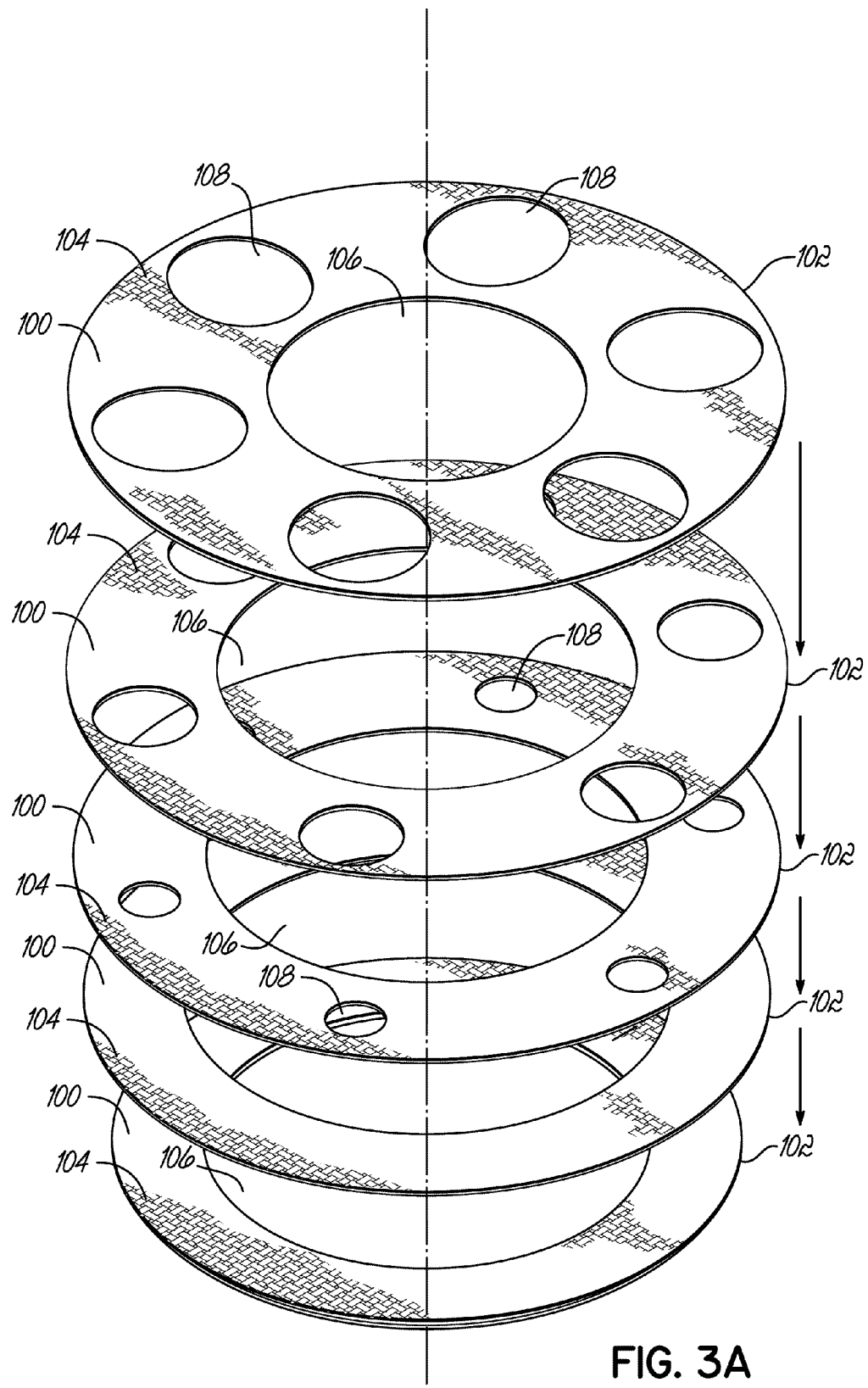
FIGS. 3A-3C are perspective views illustrating a process of stacking carbon fiber laminates to form a rotor body in accordance with one embodiment of the present invention.
Figure 3B:
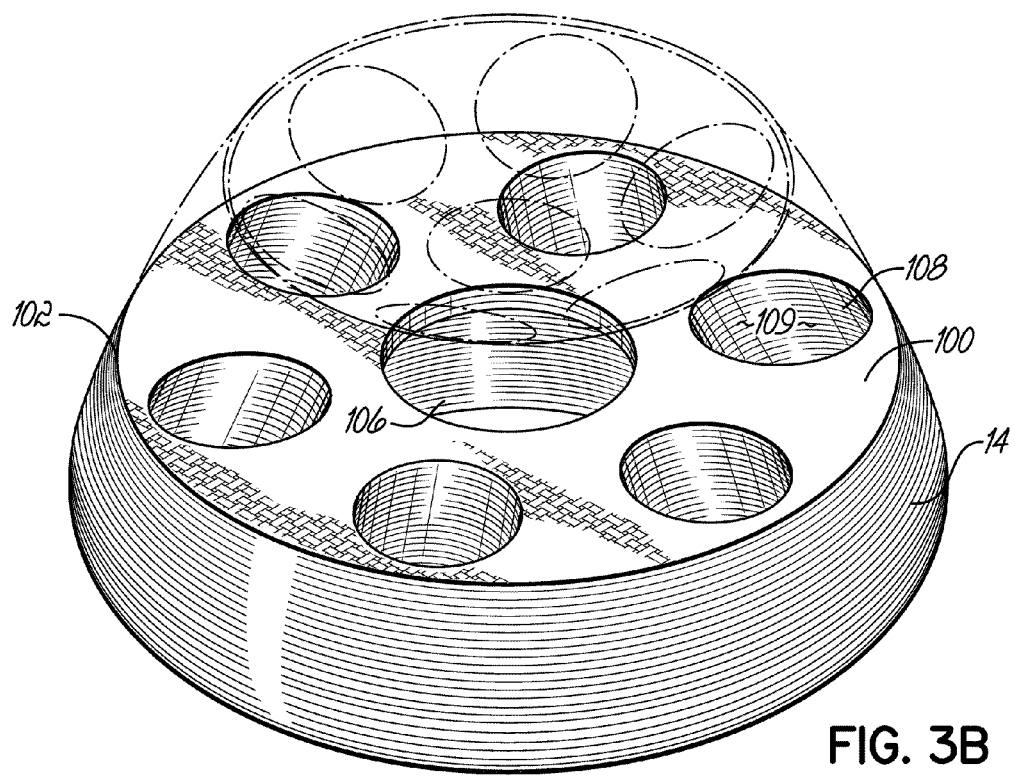

In the embodiment shown, the fixed angle centrifuge rotor body 10 is formed by compression molding resin-coated carbon fiber laminates 100. FIGS. 3A-3C and 4A-4D illustrate an exemplary method of forming rotor body 10 using stacked carbon fiber laminates 100. As shown in FIGS. 3A, the laminates 100 are made from a carbon fiber filament 104 that is woven in two transverse directions. It will be appreciated, however, that laminates 100 may alternatively be formed by weaving filaments 104 in various other configurations. The dimensions and pattern of each laminate 100 represents a cross section of the shape of the rotor body to be formed. The outer edges 102 of the laminates 100 collectively define the circumferential sidewall 14 of the rotor body 10.

In the embodiment shown, some laminate layers 100 include a central aperture 106 which is shaped to accommodate the rotor insert 120. Some laminate layers 102 also include additional apertures 108, which collectively form recesses 109 that accommodate well inserts 122 to form the sample wells 20.

Figure 3C:
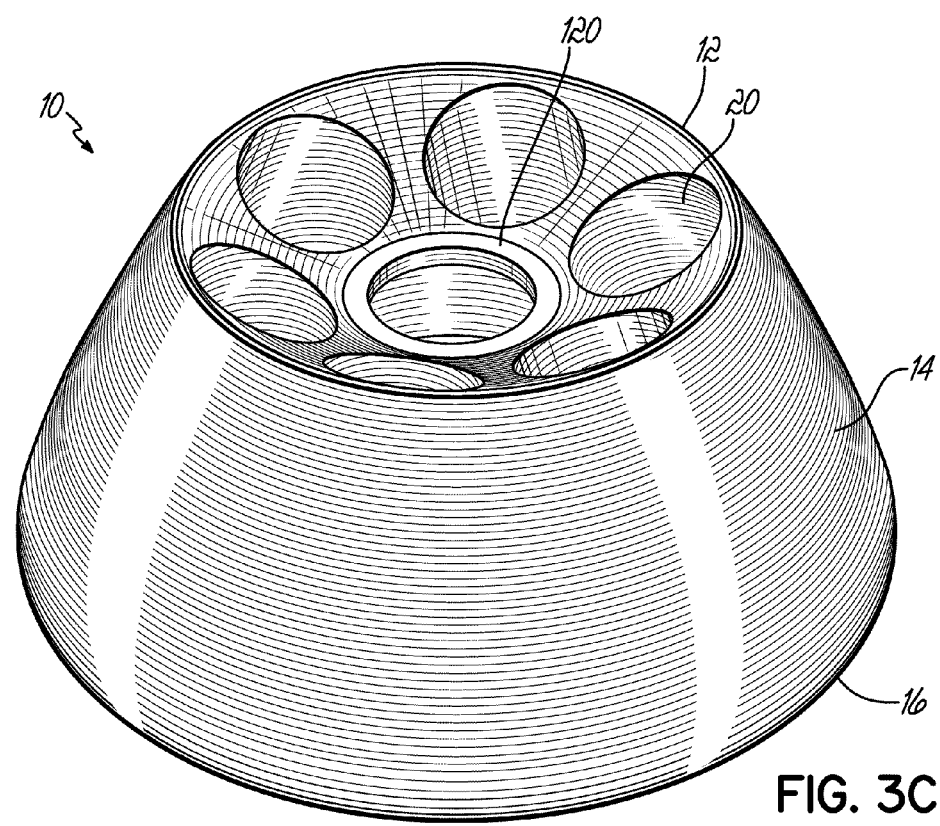
Figure 4A:
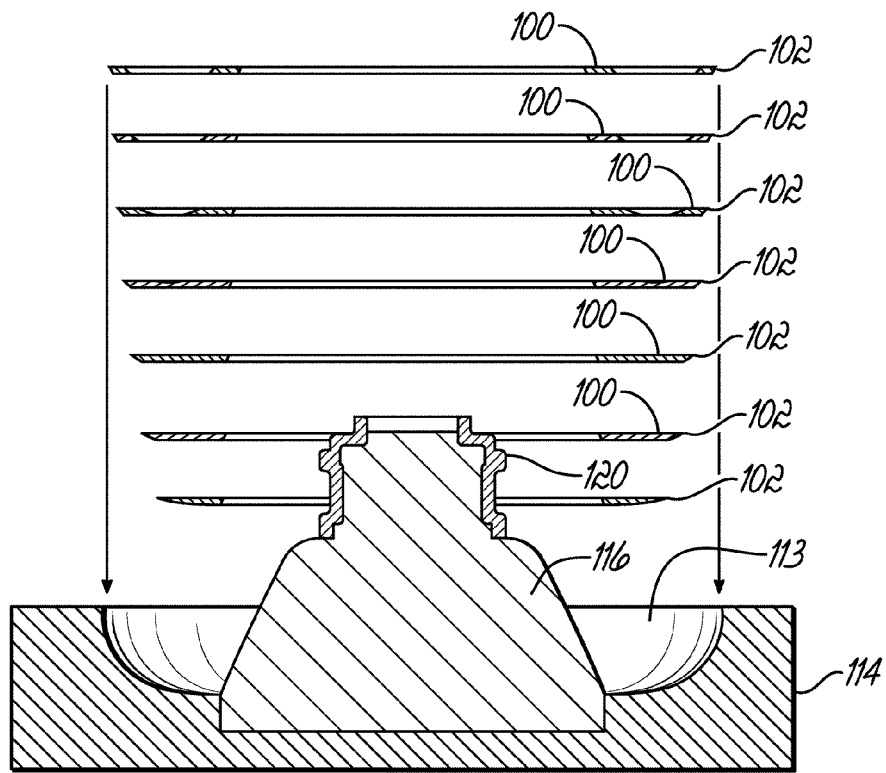
FIGS. 4A-4D are cross-sectional elevation views illustrating a compression molding process for forming a rotor body in accordance with one embodiment of the present invention.
Figure 4B:
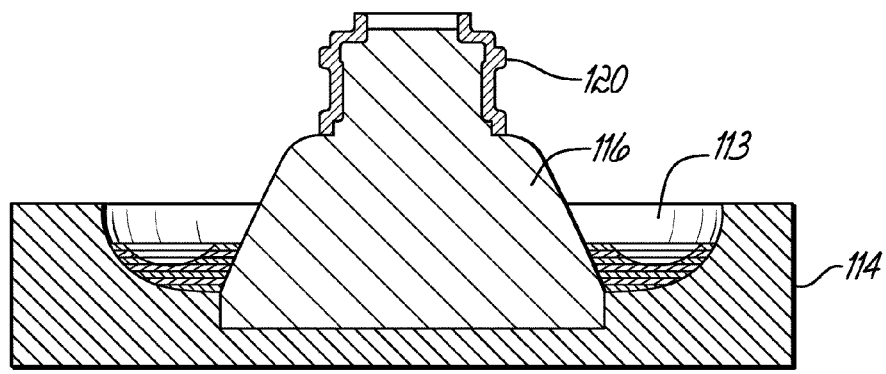
Figure 4C:
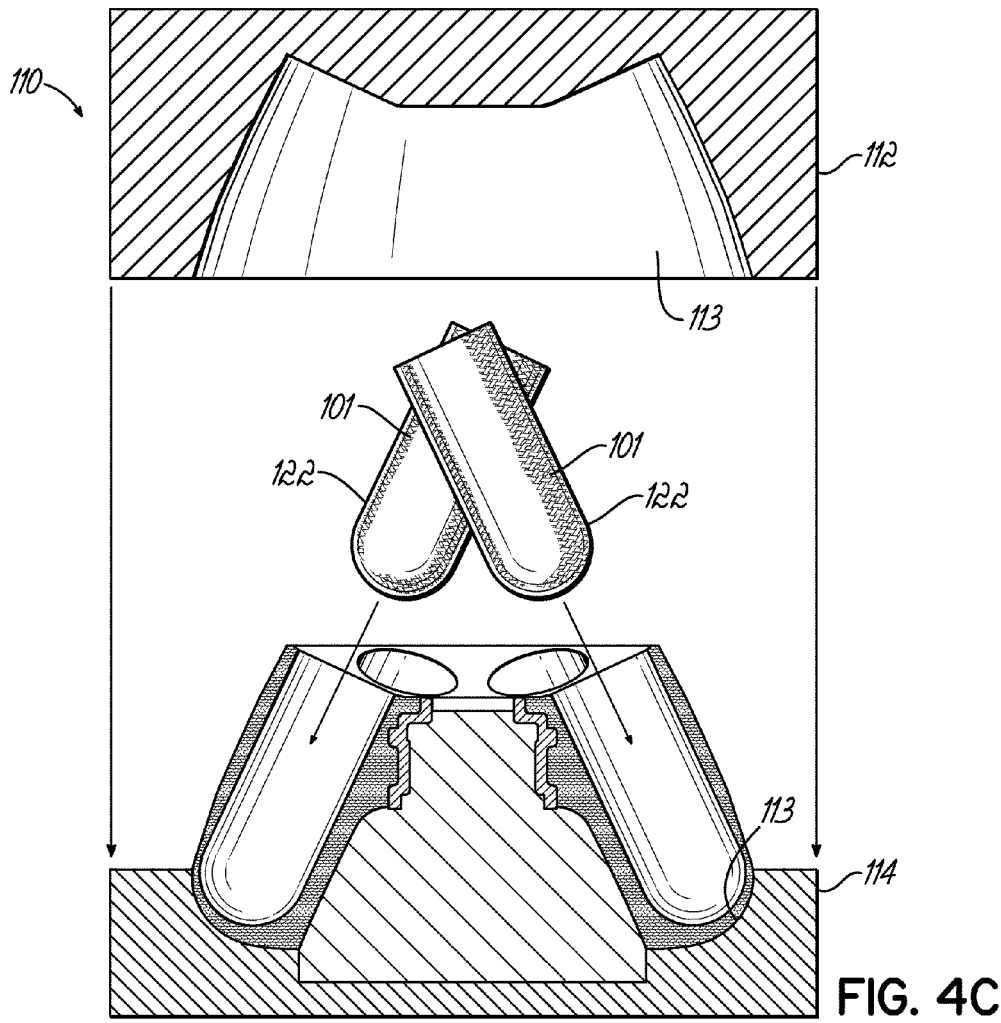
Figure 4D:
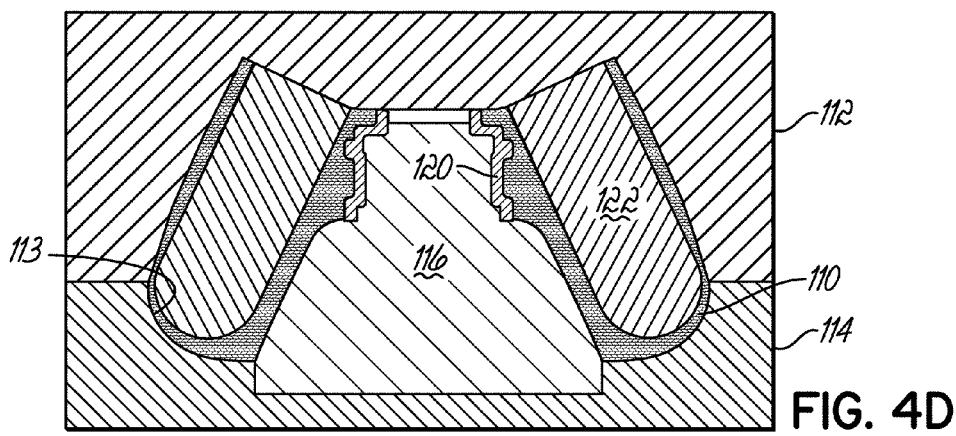

With continued reference to FIGS. 4A-4D, an exemplary mold 110 comprises a top portion 112, a bottom portion 114, and a mold core 116. The top and bottom portions 112, 114 of the mold 110 include cavities 113 that define the contours of the outer surface of the rotor body 10. The laminates 102 are stacked into the mold bottom 114 around the core 116, which supports the separate rotor insert 120 by which the completed rotor assembly 2 interfaces with the centrifuge rotor hub 90 as described above. Well inserts 122 may be wrapped in additional laminate layers 101 and placed within the recesses 109 formed from the laminate apertures 108. The top portion 112 is placed over the bottom portion 114 to enclose the stacked laminate layers 102 in the mold 110. Heat and pressure are applied to mold the layers 102 into a single integral component, the rotor body 10. Compression molding also adheres the carbon fiber to the rotor insert 120, which may be a material other than carbon fiber. The compression molding process results in a rotor body 10 and rotor insert 120 generally as shown in FIG. 3C, which is the same as the rotor body 10 of the rotor assembly 2 shown in FIG. 1, having a substantially smooth outer surface upon which a reinforcement material 40 is applied as described below.

It will be appreciated that the rotor body 10 may alternatively be formed using various other materials and by various other methods. For example, in an alternative embodiment, the rotor body 10 may be compression molded from small pieces of discontinuous resin-coated carbon fiber, or from a combination of pieces of discontinuous carbon fiber and stacked layers of carbon laminate.

Figure 5A:
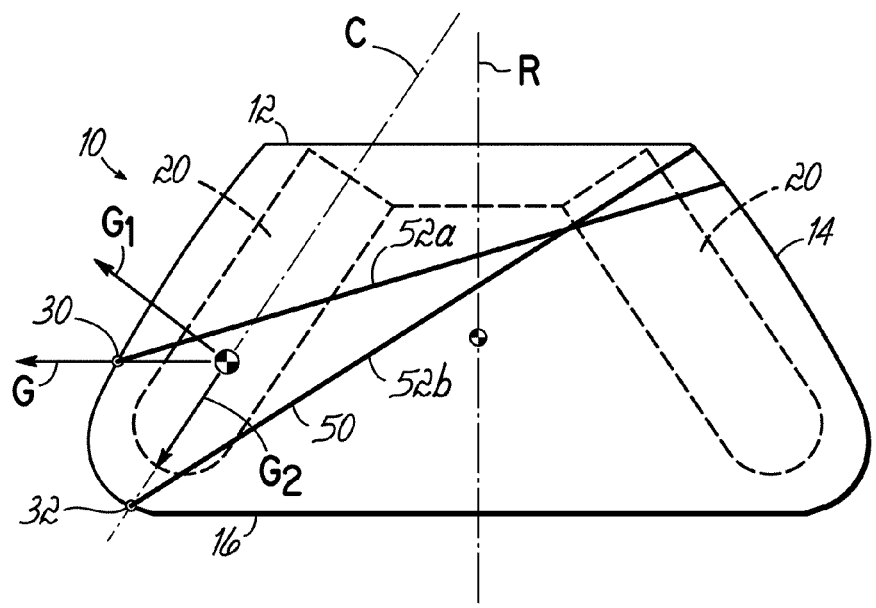
FIG. 5A is a schematic diagram of the rotor body of FIG. 3C.

FIG. 5A is a schematic illustration of a side view of rotor body 10. Arrow G denotes the outward force exerted by the center of gravity of a loaded well during centrifugation. Arrows G1 and G2 denote the components of that force normal to the outer surface of the circumferential sidewall and along central longitudinal axis C of the well 20, respectively. The schematic of FIG. 5A also depicts a helical reinforcement path 50. The helical reinforcement path 50 may include one or more of path components 52a and 52b. Path component 52a intersects a point 30 that is defined by the radial projection of the center of gravity of a loaded well, shown by G, intersecting with the outer surface of the circumferential sidewall 14. Another path component 52b intersects a point 32 that is defined by the intersection of the longitudinal axis C of a well 20 with the outer surface of the bottom 16 of the rotor body 10.

Figure 5B:
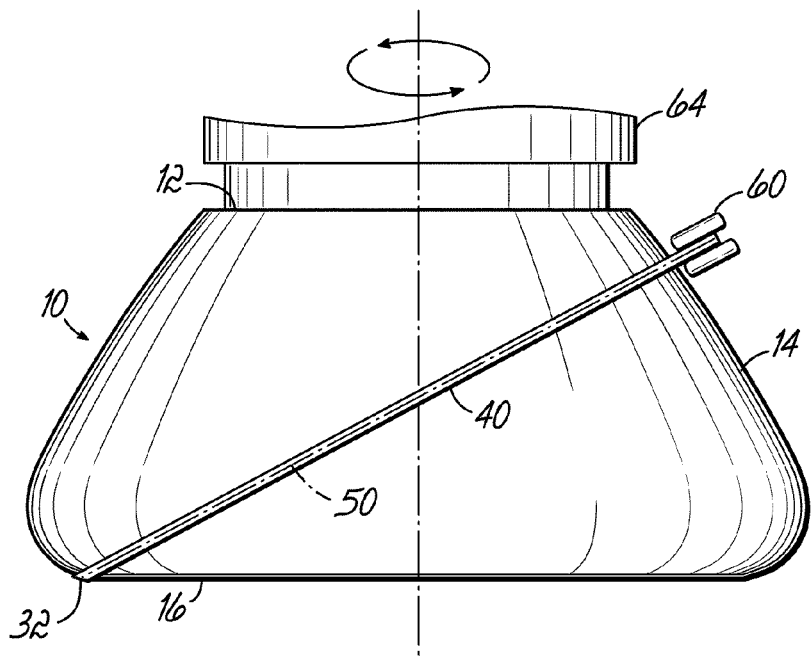
FIG. 5B is an elevation view of the rotor body of FIG. 3C with a reinforcement wound thereon according to one embodiment of the present invention.

As shown in FIG. 5B, a guide 60 is used to apply an elongate reinforcement 40 to the outer surface of the rotor body 10 along the reinforcement path 50. The path of the guide 60 relative to the rotor body 10 defines the path of the reinforcement 40. The guide 60 may have multiple degrees of freedom in order to assure that the guide 60 correctly guides the reinforcement 40 onto a generally helical path 50 while staying substantially normal to the surface of the rotor body 10. In one embodiment, the reinforcement guide 60 may have five degrees of freedom, namely, the vertical and horizontal position of the guide 60, the pitch and yaw of the guide 60, and the radial position of the guide 60 relative to the rotor axis R. The reinforcement 40 may be wound upon the rotor body 10 by rotating the rotor body 10 about the axis R while manipulating the guide 60 to apply the reinforcement 40 along the desired path 50. The rotor body 10 may be held in a generally fixed position while being rotated about the axis R, or the rotor body 10 may be moved relative to the guide 60 to define the desired path 50 for the reinforcement 40 as it is wound on the rotor body 10. Alternatively, the guide 60 may be held in a generally fixed position while the rotor body 10 is rotated about the axis R and moved relative to the guide 60 to apply the reinforcement 40 along the desired path 50.

The guide 60 tightly winds the reinforcement 40 around the smooth rotor profile. In one embodiment, sufficient tension is applied to the reinforcement 40 by the guide 60 so that the normal forces exerted upon the reinforcement 40 by the rotor body 10 substantially eliminate slipping of the reinforcement 40 relative to the smooth outer surface of the rotor body 10.

Figure 5C:
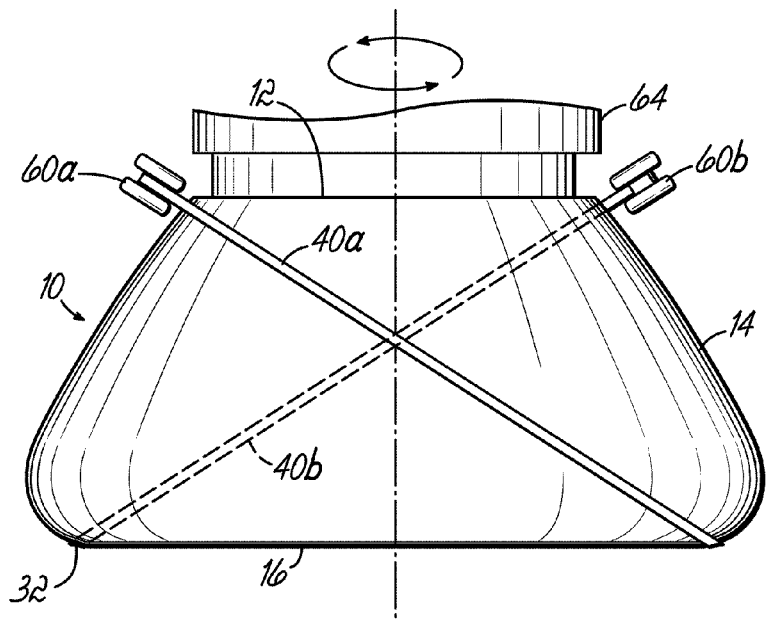
FIG. 5C is an elevation view of the rotor body of FIG. 3C with multiple reinforcements wound thereon according to one embodiment of the present invention.
Figure 5D:
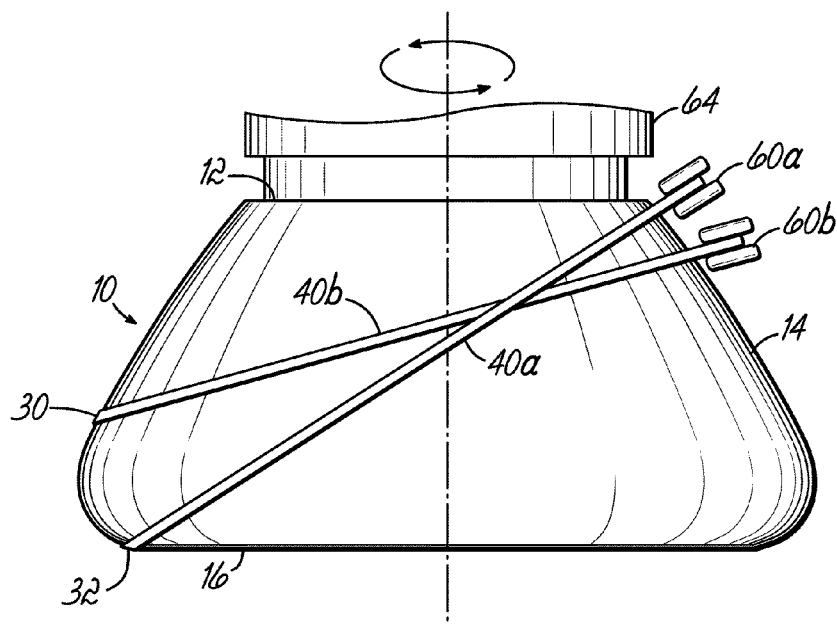
FIG. 5D is an elevation view of the rotor body of FIG. 3C with multiple reinforcements wound thereon according to another embodiment of the present invention.
Figure 6A:
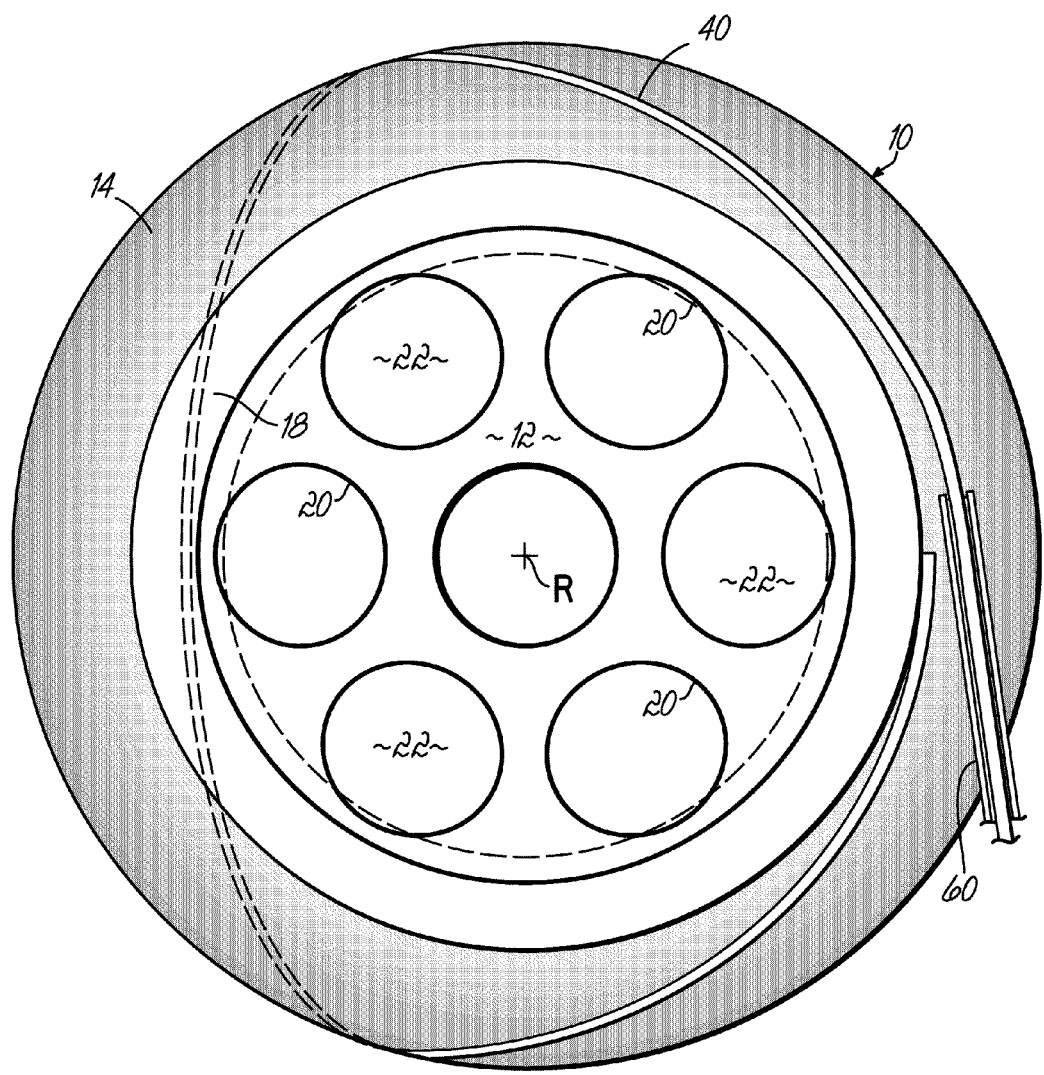
FIGS. 6A-6E are plan views of a rotor body with reinforcements wound thereon according to one embodiment of the present invention.
Figure 6B:
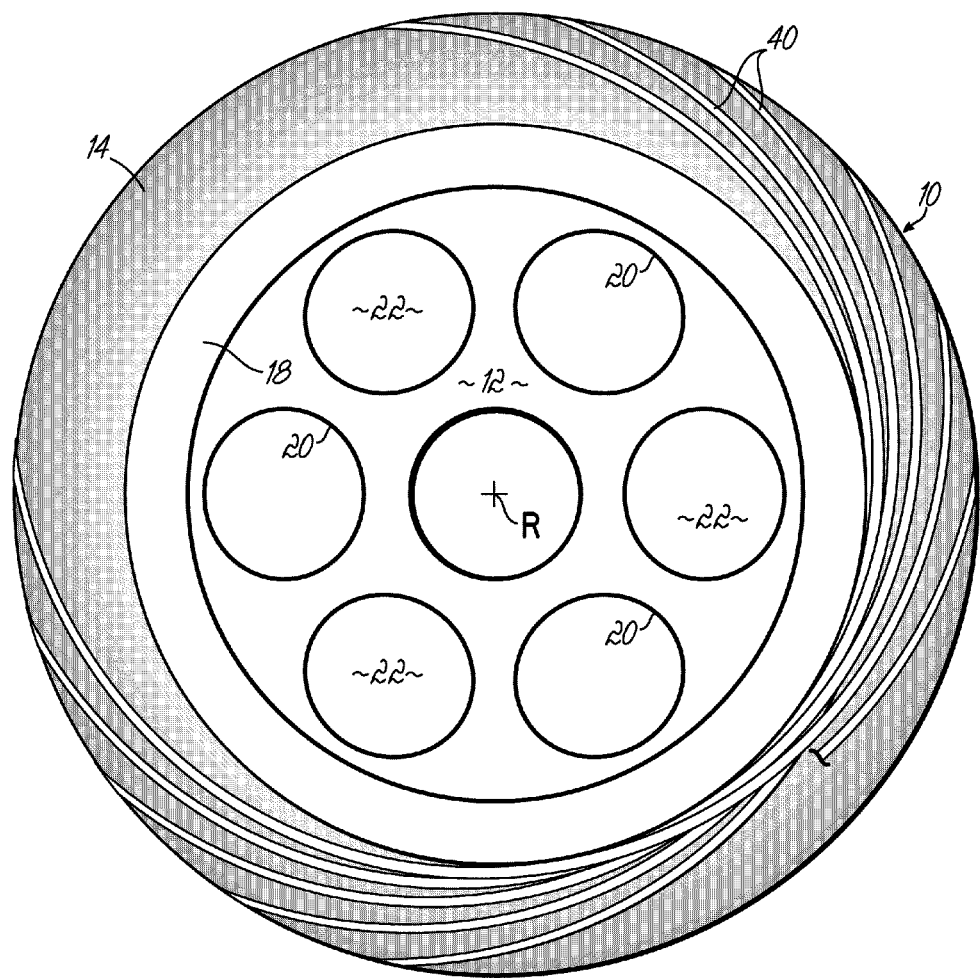
Figure 6C:
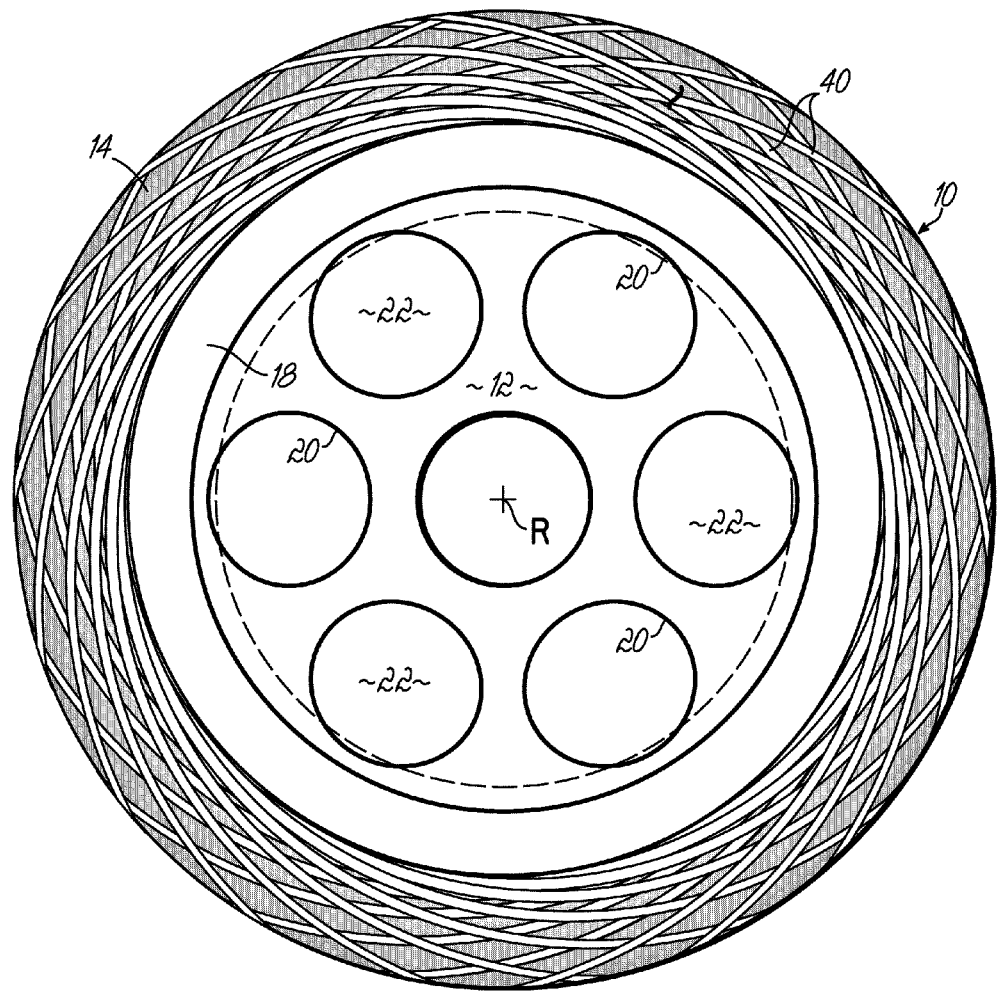
Figure 6D:
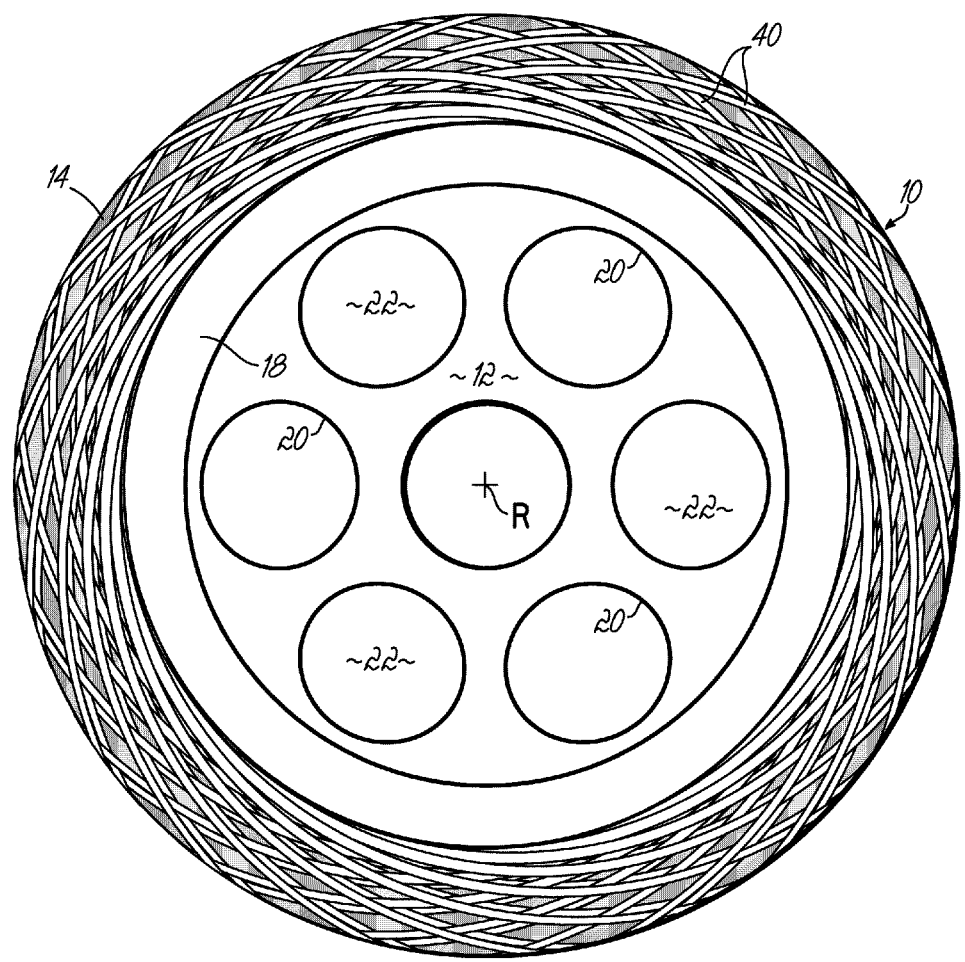
Figure 6E:
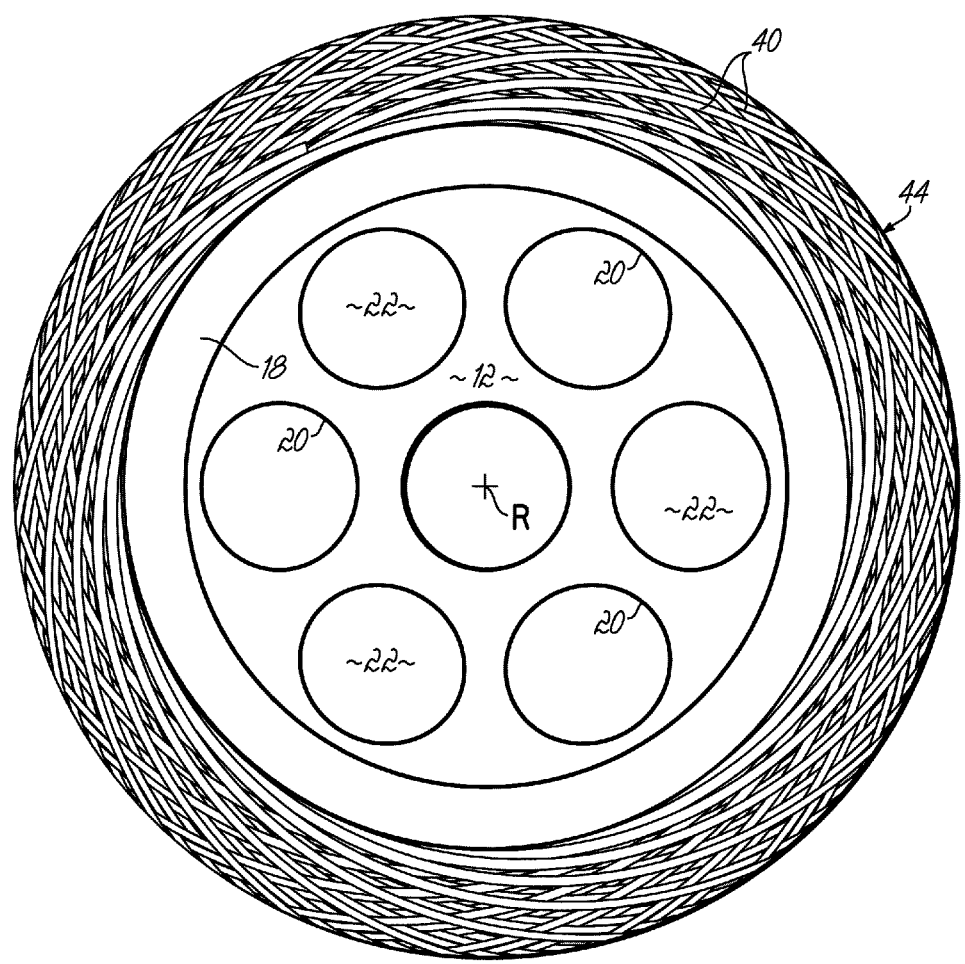

FIGS. 5C and 5D illustrate other exemplary embodiments wherein two separate elongate reinforcements 40a, 40b are simultaneously applied to the outer surface of the rotor body 10 by two guides 60a and 60b. The starting points of the reinforcements 40a, 40b may be positioned on opposite sides of the rotor body 10 to wind opposite one another, as depicted in FIG. 5C, or the starting points may be positioned proximate each other, as depicted in FIG. 5D. Each reinforcement guide 60a, 60b may have as many as five degrees of freedom as discussed above.

The reinforcement path 50 is generally helical and extends around the surface of the centrifuge rotor body 10 while also moving axially between the upper end 12 toward the lower end 16. The reinforcement path 50 may also extend at least partially around the surface of the lower end 16 of the rotor body 10.

FIGS. 6A through 6E illustrate the progression of winding reinforcement 40 to form layers by showing that the reinforcement 40 is wound repeatedly around the sidewall 14 of the rotor body 10 along the reinforcement path 50. The repeated winding of the elongate reinforcement 40 around the outer surface of the rotor body 10 eventually results in layers of reinforcement 44 covering the rotor body 10 as depicted in FIG. 1.

In one embodiment, the reinforcement 40 may be, for example, a carbon fiber filament. The filament may be a composite material of carbon fiber and resin that, at the conclusion of the winding process, is cured in order to form an integral centrifuge rotor assembly 2. Alternatively, various other high-tensile, high-modulus materials, such as glass fiber, synthetic fiber such as para-aramid fiber (i.e., Kevlar®), thermoplastic filament, metal wire, or other materials suitable for reinforcing a rotor body may be used instead of carbon fiber.

In FIGS. 2 and 5A, points 30 and 32 are shown on the outer surface of the substantially smooth rotor body 10. Point 30 corresponds to the radial projection onto the surface of sidewall 14 of the location of the center of gravity of a loaded well. Point 32 corresponds to the intersection of the central longitudinal axis C of one of the wells 20 with the outer surface of the lower end 16. In one embodiment, the reinforcement path 50 overlaps at one or both of these points 30, 32 such that at least two portions of reinforcement 40 interlock to cover one or both points 30, 32. Each interlock may be formed, for example, by overlapping portions of reinforcement 40 and applied resin. As shown in FIG. 1, vertical bands of interlocks 52 and horizontal bands of interlocks 54 may be formed by the layers of reinforcement 44 around the rotor body 10. One or more of the vertical bands 52 may be located at the radial projection of a well longitudinal axis C on the surface of the rotor body 10. One of the horizontal bands 54 may be disposed at the center of gravity of the loaded wells. This is one method by which the reinforcement path 50 may intersect points such as points 30 and 32.

Point 32 is also shown in FIG. 5C, and points 30 and 32 are shown in FIG. 5D. Where multiple reinforcements 40a, 40b are used to construct the reinforcement 40, an intersection of reinforcement 40a with reinforcement 40b may be positioned at the projected center of gravity 30 or longitudinal axis intersection point 32.

Figure 2A:
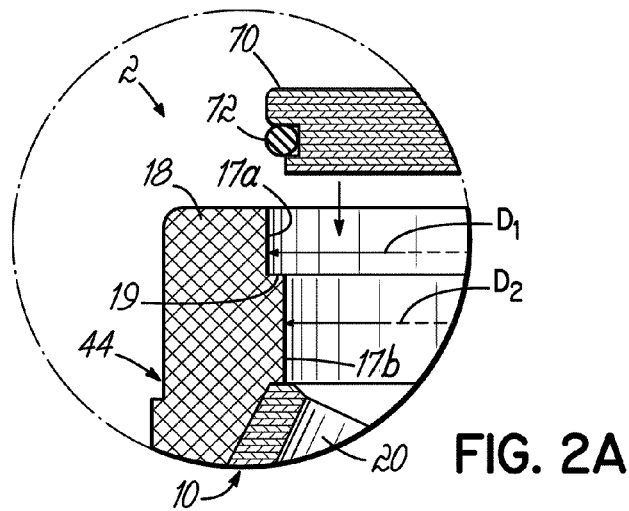
FIG. 2A is an enlarged detail view similar to FIG. 2B, showing the lid removed from the lip of the rotor assembly.
Figure 2B:
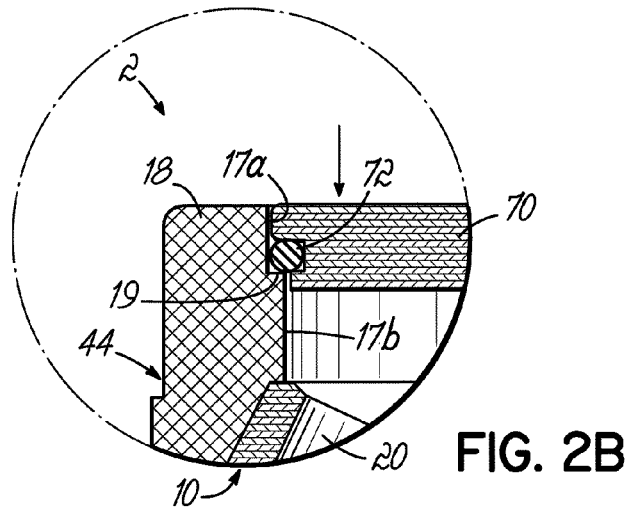
FIG. 2B is an enlarged partial detail view of the encircled area 2B of FIG. 2.

In the embodiment shown and described herein, the elongate reinforcement 40 may further be applied to the rotor body 10 along a path extending in a generally circumferential direction at least partly around the upper end 12 of the rotor body 10 to define a lip 18 proximate the upper end 12 of the rotor body 10. As shown in FIGS. 5B through 5D, a fixture 64 may be placed at the upper end 12 of the rotor wherein the filament 40 may be wrapped around the generally cylindrical fixture 64 in order to form the lip 18 (see FIG. 2) that is above the upper end 12 of the rotor body 10. As shown in FIG. 2A, the lip 18 may be formed with a stepped inner profile including an upper inner diameter D1 that is greater than a lower inner diameter D2, such that the top inner sidewall 17a is further back then the lower inner sidewall 17b. The stepped inner profile results in a horizontal ledge 19 between the upper and lower inner sidewalls 17a, 17b of the lip 18.

Figure 2C:
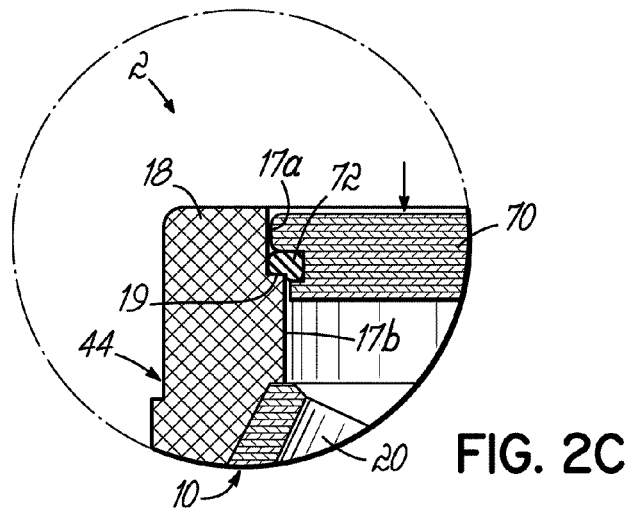
FIG. 2C is an enlarged detail view similar to FIG. 2B, showing the lid sealingly coupled to the lip of the rotor assembly.

As shown in FIGS. 2 and 2A-2C, the centrifuge rotor assembly 2 may include a lid 70 with an o-ring 72 disposed thereon. The lid 70 may be configured to fit within the lip 18 such that the lid 70 rests on a ledge 19 formed by the stepped inner profile of the lip 18. Ideally, the lid 70 is formed such that, when the lid 70 rests upon the lip 18, there is sliding contact between the lid 70 and the sidewall of the lip 18 that does not impede removal of the lid 70. To create a tight seal, the lid 70 is forced downwardly into the lip 18 by the lid screw 94 as described above. The o-ring 72, when pressed downwardly, expands in a radial direction such that it presses tightly against the sidewall 17a, as shown in FIG. 2C, thus creating a seal. The lid 70 is securely sealed proximate the upper end 12 of the rotor body 10, but is easily removable by releasing the downward force exerted upon the lid 70 by the lid screw 94. When the force is released, the resilient o-ring retracts away from the sidewall of the lip 18 so that there is again only sliding contact between the lid 70 and the lip 18. The lid 70 can then be easily removed.

Figure 7A:
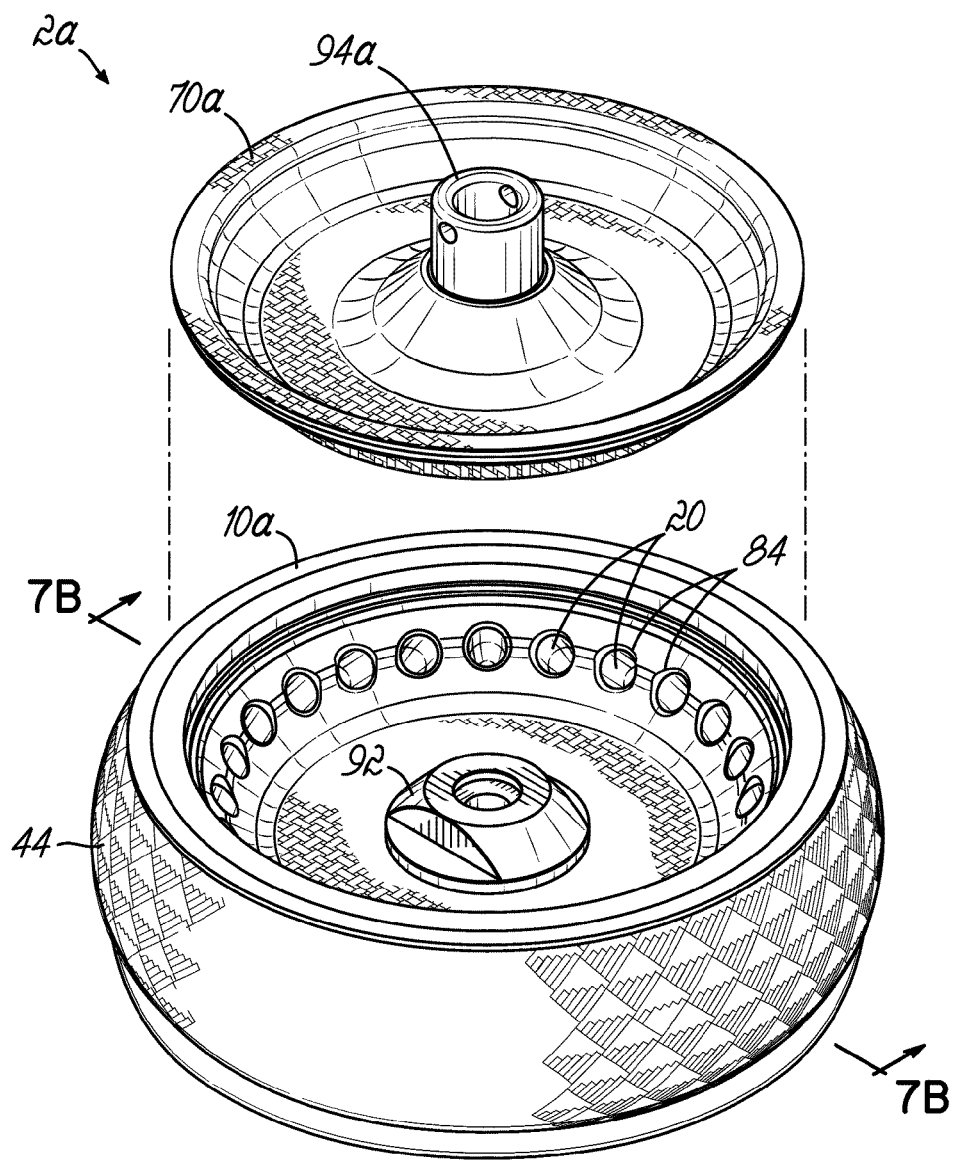
FIG. 7A is a perspective view of another exemplary rotor assembly with a lid in accordance with one embodiment of the present invention.
Figure 7B:
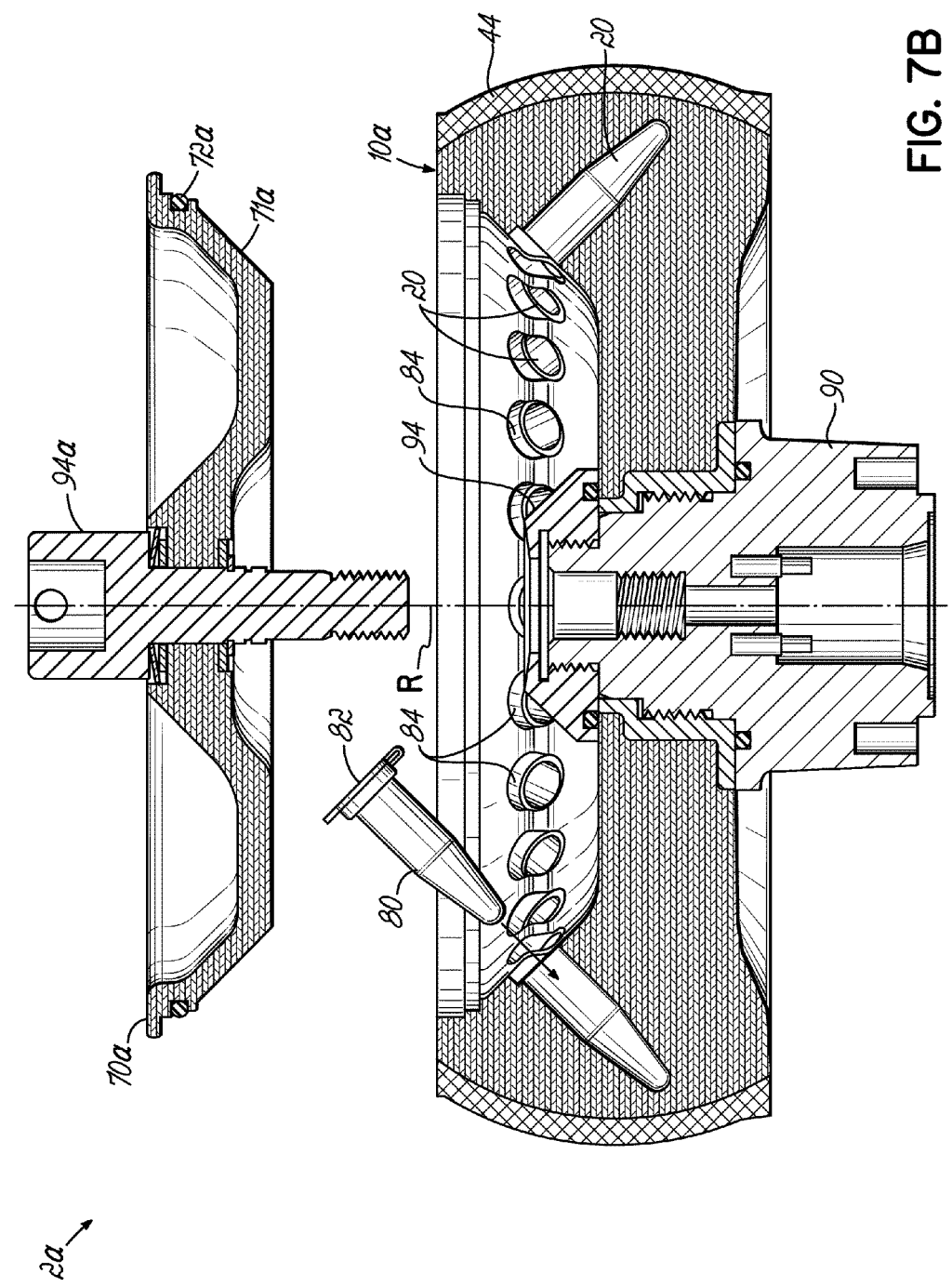
FIG. 7B is a cross-sectional elevation view of the centrifuge rotor assembly of FIG. 7A taken along line 7B-7B.
Figure 7C:
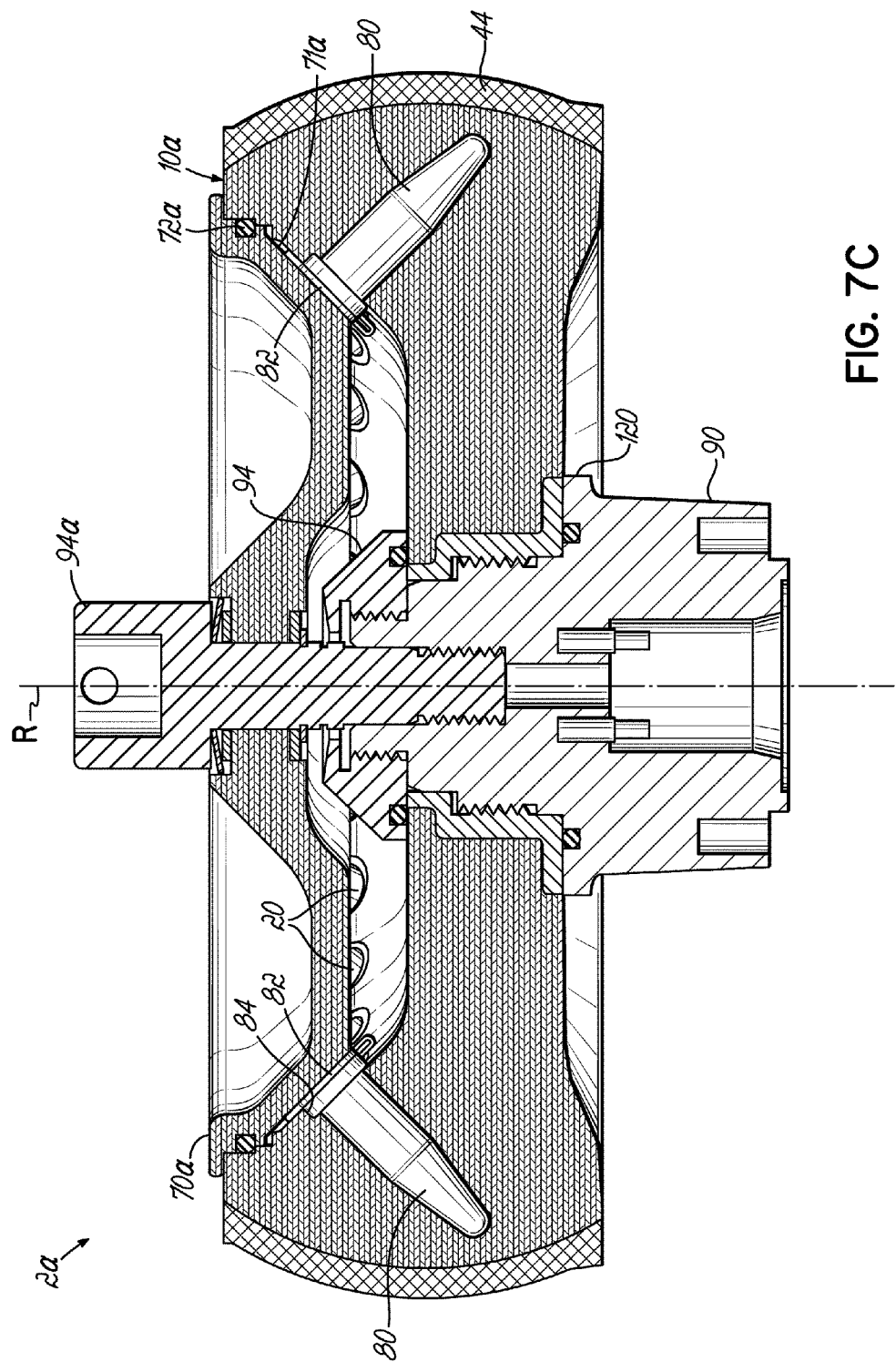
FIG. 7C is a cross-sectional elevation view of the centrifuge rotor of FIGS. 7A and 7B in an assembled configuration.

FIGS. 7A-7C depict another exemplary centrifuge rotor assembly 2a, including a reinforced rotor body 10a and a lid 70a which may be constructed as described above with reference to FIGS. 3A-3C and 4A-4D. Similar features are similarly numbered. The outer surface of the rotor body 10a is covered with layers of reinforcement 44 as described above. A lid screw 94a screws into a hub 90a in order to secure the lid 70a. The downward force exerted by the lid screw 94a on the lid 70a and the o-ring 72a creates a seal similar to that explained above with respect to FIG. 2.

In this embodiment, the lid 70a is configured to facilitate securing sample containers 80 within the wells 20. The lid 70a includes an angled surface 71a on its underside. As shown in FIG. 7B, the sample containers 80 include caps 82 which press onto the tops of the sample containers 80 in order to contain their contents. The rotor body 10a include contour bores 84 at the top of the wells 20 that are sized to receive the caps 82 as the wells 20 receive the sample containers 80. When the lid screw 94a presses downwardly on the lid 70a, the angled surface 71a is positioned such that it presses downwardly on the caps 82, forcing the caps 82 onto the containers 80 loaded into the wells 20, as depicted in FIG. 7C, and containing the caps 82 securely within the contour bores 84. Thus, in addition to providing a seal as illustrated above, the lid 70a also provides additional containment for the sample containers 80. As above, the lid 70a can be easily removed when the downward force from the lid screw 94a is released.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A centrifuge rotor, comprising:
a rotor body having:
a rotational axis,
a first axial end and a second axial end,
a circumferential sidewall extending between said first and second axial ends, and
a plurality of wells adapted to receive containers for centrifugation, said wells opening on said first axial end of said rotor body; and
an elongate reinforcement extending around said circumferential sidewall of said rotor body along a helical path;
wherein at least two adjacent path components of said reinforcement overlap and interlock each other at a location on said circumferential sidewall corresponding to the axial position of a center of gravity of a loaded well of one of said plurality of wells.

2. The centrifuge rotor of claim 1, wherein said elongate reinforcement comprises a single carbon fiber tow.

3. The centrifuge rotor of claim 1, wherein said elongate reinforcement comprises first and second carbon fiber tows.

4. The centrifuge rotor of claim 1, wherein said second end defines a bottom surface of said rotor body, and wherein said helical path extends along said circumferential sidewall and across at least a portion of said bottom surface.

5. The centrifuge rotor of claim 1, wherein two or more portions of said reinforcement also interlock at a location corresponding to the intersection of a longitudinal axis of one of said plurality of wells with said bottom surface.

6. The centrifuge rotor of claim 1, wherein at least a portion of said elongate reinforcement extends along a circumferential direction proximate said first end of said rotor body.

7. The centrifuge rotor of claim 1, wherein said rotor body comprises compression molded carbon fiber material.

8. The centrifuge rotor of claim 1, further comprising:
a lid couplable to said first end of said rotor body;
said lid engaging containers received in said wells when said lid is coupled to said rotor body such that the containers are secured within said wells by said lid.

9. The centrifuge rotor of claim 8, wherein:
said wells are arranged such that a longitudinal axis of each said well is angled in a direction toward said rotational axis; and
wherein said lid includes at least one surface angled in a direction to restrain movement of containers along said respective longitudinal axes of said wells when said lid is coupled to said rotor body.

10. A centrifuge rotor, comprising:
a rotor body having:
a rotational axis,
a first axial end and a second axial end,
a circumferential sidewall extending between said first and second axial ends,
an opening proximate said first end of said rotor body, said opening including a first inner diameter and a second inner diameter, said first inner diameter being greater than said second inner diameter, said first and second inner diameters defining a stepped profile for receiving and supporting said lid proximate said first end and within said opening, and
a plurality of wells adapted to receive containers for centrifugation, said wells opening on said first axial end of said rotor body;
a lid couplable to said first end of said rotor body;
an annular sealing member coupled to said lid, said sealing member having an outer diameter less than said first inner diameter of said rotor body whereby said lid is received on and removed from said first end of said rotor body without interference between said outer diameter of said sealing member and said first inner diameter, said outer diameter of said sealing member expanding to sealingly engage said first inner diameter when said lid is fully seated on said first end of said rotor body.

11. A centrifuge rotor, comprising:
a rotor body having:
a rotational axis,
a first axial end and a second axial end,
a circumferential sidewall extending between said first and second axial ends, and
a plurality of wells adapted to receive containers for centrifugation, said wells opening on said first axial end of said rotor body; and
an elongate reinforcement extending around said circumferential sidewall of said rotor body along a helical path;
wherein at least two adjacent path components of said reinforcement overlap and interlock each other at a location corresponding to the intersection of a longitudinal axis of one of said plurality of wells with said bottom surface.

12. The centrifuge rotor of claim 11, wherein said elongate reinforcement comprises a single carbon fiber tow.

13. The centrifuge rotor of claim 11, wherein said elongate reinforcement comprises first and second carbon fiber tows.

14. The centrifuge rotor of claim 11, wherein said second end defines a bottom surface of said rotor body, and wherein said helical path extends along said circumferential sidewall and across at least a portion of said bottom surface.

15. The centrifuge rotor of claim 11, wherein at least a portion of said elongate reinforcement extends along a circumferential direction proximate said first end of said rotor body.

16. The centrifuge rotor of claim 11, wherein said rotor body comprises compression molded carbon fiber material.

17. A centrifuge rotor, comprising:
a rotor body having:
a rotational axis,
a first axial end and a second axial end,
a circumferential sidewall extending between said first and second axial ends, and a plurality of wells adapted to receive containers for centrifugation, said wells opening on said first axial end of said rotor body; and a single elongate reinforcement extending around said circumferential sidewall of said rotor body along a helical path;

wherein at least a portion of said elongate reinforcement is wrapped circumferentially around said first end of said rotor body to thereby define a lip proximate said first end.

* * * * *